W. C. BAKER.
BRAKE MECHANISM.
APPLICATION FILED JULY 22, 1918.
1,308,142.
Patented July 1, 1919.
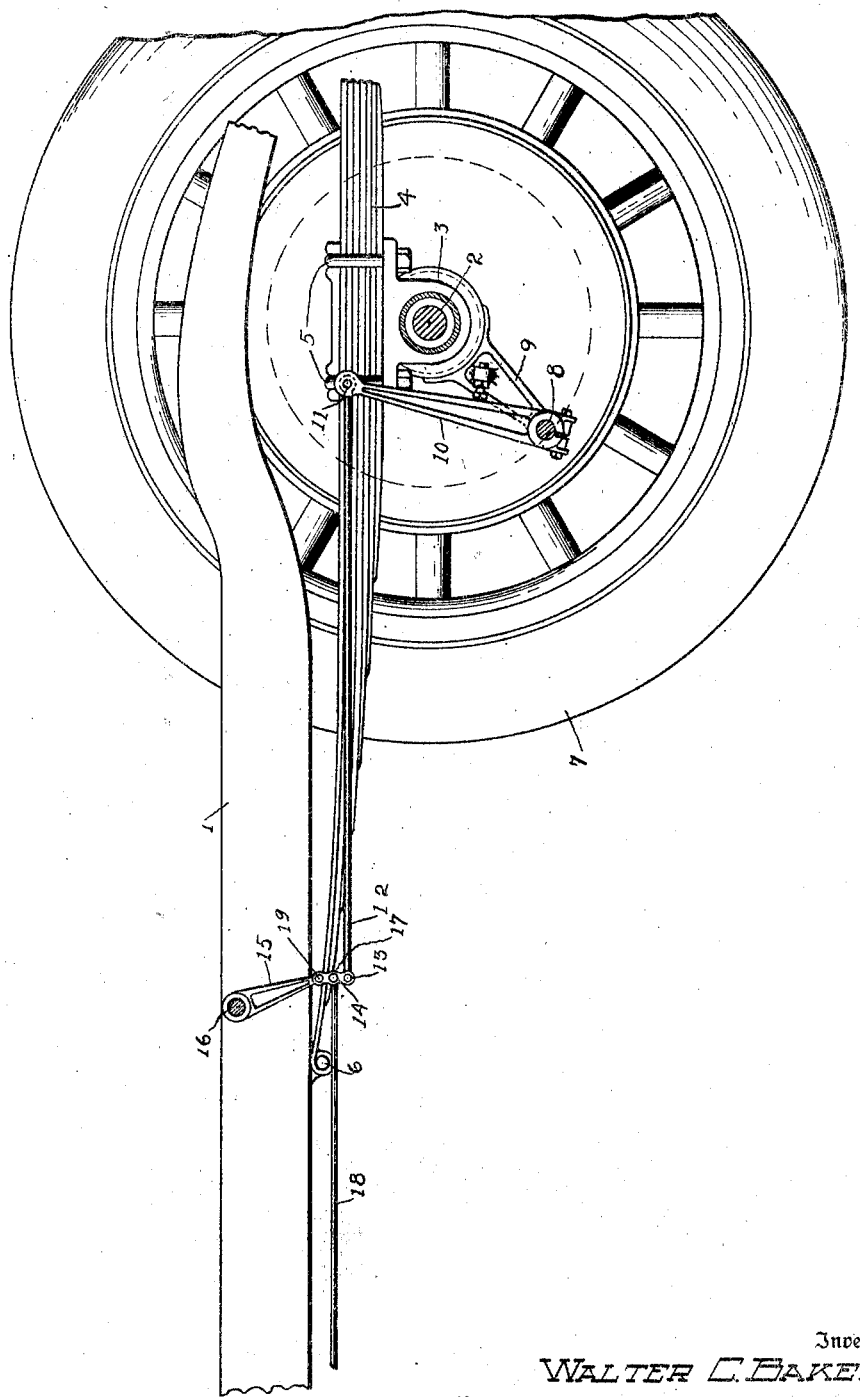
Inventor
WALTER C. BAKER
By
Attorney

UNITED STATES PATENT OFFICE.

WALTER C. BAKER, OF LAKEWOOD, OHIO, ASSIGNOR TO THE STANDARD PARTS COMPANY, OF CLEVELAND, OHIO, A CORPORATION OF OHIO

BRAKE MECHANISM.

1,308,142.  Specification of Letters Patent.  Patented July 1, 1919.

Application filed July 22, 1918. Serial No. 246,050.

*To all whom it may concern:*

Be it known that I, WALTER C. BAKER, a citizen of the United States, and a resident of Lakewood, county of Cuyahoga, State of Ohio, have invented certain new and useful Improvements in Brake Mechanism, of which the following is a specification.

This invention relates to brake mechanism for vehicles and more particularly to brake mechanism for use in connection with automobiles provided with the Hotchkiss type of drive, wherein the torque in the driving axle and the driving thrusts are taken through the springs, the radius rod and torque rod usually employed in other types of drive, being omitted. I have found that the driving and braking torque in the driving axle of an automobile equipped with the Hotchkiss type of drive, cause the axle to oscillate about an axis removed from the axis of the axle and the road wheels. In vehicles, as heretofore equipped with the Hotchkiss type of drive, the flexibility of the springs between the axle and the body frame has seriously interfered with the operation of the brake mechanism, owing to the oscillation of the axle, as above described. This movement of the axle has caused the brakes either to be set up tighter than is desired, or to become released, according as the car is moving forward or backward at the time when the brakes are applied.

It is the general purpose and object of this invention to so connect and arrange the brake operating parts, with reference to the rear or driving axle, that the up and down movements of the axle relative to the body and the oscillation of the axle, will have practically no effect on the brake mechanism. I accomplish this result by arranging the parts of the brake mechanism according to the principles hereinafter set forth, and illustrated in the accompanying drawing, which is a somewhat diagrammatic longitudinal section of the rear portion of a vehicle.

In the drawing, 1 represents one of the side frames of an automobile and 2, a driving axle, which includes a housing 3. A spring 4, of which there will be a pair, in accordance with the usual practice, is connected with the housing 3 by means of clips 5 and with the frame 1 by means of the driving bolt 6, on which the end of the spring is pivoted. One of the wheels is illustrated at 7 and may be mounted on the axle 2, according to any of the well known arrangements. The wheel 7 may be provided with the usual brakes, and for the purpose of illustrating my invention I have shown at 8, a shaft such as is commonly used in actuating a brake. The shaft 8 is rotatably mounted on one or more brackets 9, secured to the axle housing 3 and is actuated by means of the usual lever arm 10 which will be connected with the brake lever or pedal on the body of the vehicle.

It will be noted that in the case of a vehicle having the driving axle connected with the frame solely through the springs, as illustrated in the drawing, the axle is not only free to move up and down relatively to the body, but the usual driving and braking torques, will oscillate the axle, on account of the flexibility of the springs, which are the only members that resist the oscillation. I have discovered that in the case of a vehicle equipped substantially as shown in the drawing, the axle as a whole rotates under the influence of the driving and braking torques about an axis parallel with the axis of the axle and which may be approximately at the point 11, although the exact location of this axis will vary with the shape, length and flexibility of the springs. I have accordingly located at the point 11, the pivot pin at the outer end of the arm 10 and by so locating this pivot pin, the turning movements of the axle, due to torque therein, produce practically no movements of the center on the arm 10 and hence there is no tendency to either set-up or release the brakes.

Extending from the arm 10, is a rod 12 pivotally connected at 13 to one end of an equalizer 14 which has its other end connected at 19 with the arm 15 secured on a shaft 16. It will be observed that the spring 4 acts substantially as a radius rod and that the axle 2 swings in a curved path which approximates an arc about an axis near the center of the bolt 6, when the axle moves up and down relatively to the body. The shaft 16 and the arm 15 are carried by the body frame 1 and, therefore, in order that the axle movements may not affect the brake arm 10, it is important that the center 17 of the equalizer 14 be located so that the up and down movements of the axle will carry the point 11 in a path which is substantially an arc about the pivot 17. I have discovered that by locating the points 11 and 17 in accordance with the foregoing principles, the usual movements of the body and axle will have practically no influence on the action of the brakes. The brake for the wheel at the opposite end of the axle will be actuated by a rod corresponding to the rod 12, but having its forward end connected with an arm, on shaft 16, of the same length as arm 15 and whose lower center is in alinement with the point 19.

In actuating the brakes the shaft 16 will be rocked by any suitable mechanism from the usual pedal or hand lever on the body of the vehicle, and for this purpose I have illustrated the rod 18 which is connected with the center 17 of the equalizer 14. These features, however, may be arranged in any desired manner and form no part of the present invention, such parts being entirely supported on the body are not affected in any way by the movements of the axle.

A further advantage resulting from the arrangement of the brake lever in accordance with the principles above described, is that the movements of the vehicle do not produce any movements in the brake pedal or hand lever, and when the brakes are set, and the vehicle is traveling over a rough road there will be no tendency to either set up the brakes, release them, or to put undue strain on the connections.

Having thus described my invention, what I claim is:—

1. In a motor vehicle, the combination of the frame of the vehicle, a driving axle, a driving wheel on said axle, a brake for said wheel having an operating arm, a spring connection between said axle and frame permitting the axle to oscillate under the influence of driving and braking torque, brake-operating means carried by said frame, and a rod connected at one end to said means at a point substantially coincident with the axis about which the said axle oscillates under the influence of driving and braking torque and at its opposite end to the second mentioned arm at a point substantially coincident with the axis about which said axle swings in its movements relative to the frame.

2. In a motor vehicle, the combination of the frame of the vehicle, a driving axle, a driving wheel on said axle, a spring operatively connecting said axle and said frame and permitting the axle to oscillate under the influence of driving and braking torque, a brake for said wheel, an arm connected with said brake, and operating means connected with said arm at a point substantially coincident with the axis about which the said axle oscillates under the influence of the driving and braking torque.

3. In a motor vehicle, the combination of the frame of the vehicle, a driving axle, a driving wheel on said axle, a spring operatively connecting said axle and frame and permitting the axle to oscillate under the influence of driving and braking torque, a brake for said wheel, an arm for operating said brake carried by the axle, brake operating means on said frame, and a rod connected at one end with said arm and at the other end with said means at a point substantially coincident with the axis about which said axle swings in its movements relative to the frame.

In testimony whereof I affix my signature.

WALTER C. BAKER.